(12) United States Patent
Futami et al.

(10) Patent No.: US 7,623,792 B2
(45) Date of Patent: Nov. 24, 2009

(54) CLOCK EXTRACTING METHOD AND APPARATUS THEREOF

(75) Inventors: Fumio Futami, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 450 days.

(21) Appl. No.: 11/197,260

(22) Filed: Aug. 5, 2005

(65) Prior Publication Data

US 2006/0093375 A1    May 4, 2006

(30) Foreign Application Priority Data

Oct. 28, 2004    (JP) ............................. 2004-314130

(51) Int. Cl.
 *H04B 10/00*    (2006.01)
(52) U.S. Cl. ........................ 398/155; 398/54; 398/154
(58) Field of Classification Search ................ 398/155; 370/395, 518
See application file for complete search history.

(56) References Cited

U.S. PATENT DOCUMENTS

| | | | | |
|---|---|---|---|---|
| 5,457,559 | A | * | 10/1995 | Saito et al. ..................... 398/98 |
| 5,760,937 | A | * | 6/1998 | Ishikawa et al. .............. 398/98 |
| 5,831,752 | A | * | 11/1998 | Cotter et al. ................... 398/54 |
| 5,870,441 | A | * | 2/1999 | Cotton et al. ................. 375/354 |
| 7,050,722 | B2 | * | 5/2006 | Leclerc et al. ............... 398/175 |
| 7,103,282 | B2 | * | 9/2006 | White ........................... 398/155 |

FOREIGN PATENT DOCUMENTS

JP    2003-262841    9/2003

OTHER PUBLICATIONS

Hao Dong et al., "Clock recovery using cascaded LiNbO3 modulator", Oct. 4, 2004, Optical Society of America, Optics Express, vol. 12, No. 20.*
Shin Arahira et al., "All-Optical 160-Gb/s Clock Extraction With a Mode-Locked Laser Diode Module", IEEE Photonics Technology Letters, vol. 16, No. 6, Jun. 2004.*
D.T.K. Tong, et al., "160Gbit/s clock recovery using electroabsorption modulator-based phaselocked loop", Electronic Letters, Nov. 9, 2000, vol. 36, No. 23, pp. 1951-1952.
Osamu Kumatani, et al., "Prescaled Timing Extraction From 400Gb/s Optical Signal Using a Phase Lock Loop Based on Four-Wave-Mixing in a Laser Diode Amplifier", IEEE Photonics Technology Letters, vol. 8, No. 8, Aug. 1996, pp. 1094-1096.
Leaf A. Jiang et al., "Timing Jitter eater for optical Pulse trains", Optics Letters, vol. 28, No. 2, Jan. 15, 2003, pp. 78-80.

* cited by examiner

*Primary Examiner*—Dzung D Tran
(74) *Attorney, Agent, or Firm*—Staas & Halsey LLP

(57) ABSTRACT

A clock extracting apparatus arranges bit intervals of a signal light train incident on a signal light processing section to have uneven periods, makes bit intervals between a predetermined signal light and signal lights adjacent to the predetermined signal light to be longer than a switching time of an electro-optical gate, selectively demultiplexes the predetermined signal light using the electro-optical gate, and extracts a clock synchronized with the signal light train from the demultiplexed signal light. Thus, it becomes possible to extract a clock synchronized with an ultra-high speed from a signal light train.

15 Claims, 8 Drawing Sheets

CLOCK EXTRACTING METHOD AND APPARATUS THEREOF

BACKGROUND OF THE INVENTION

1. Field of the Invention

The present invention relates to a clock extracting method and an apparatus thereof for stably extracting, from a signal light for an optical communication, in particular, a signal light at a bit rate higher than a working speed limit of an electronic circuit, a synchronous clock of a frequency which is 1/N(N: positive integer, the same rule will be applied hereafter) of the bit rate of the signal light

2. Description of the Related Art

In recent years, with an increase of channel capacity in an optical communication, research and development have been actively performed in the technology of optical time division multiplexing (OTDM) for increasing the capacity per one wavelength, as well as in the technology of wavelength division multiplexing (WDM) for demultiplexing optical signals into a plurality of wavelengths. An OTDM system multiplexes optical signals of pulse widths narrower than bit intervals in the time domain, to increase the transmission capacity per one wavelength. In this type of OTDM system, the pulse generating technology is important. Up to this date, the fiber transmission of a signal light obtained by multiplexing short pulsed lights with periods from picoseconds to subpicoseconds has been realized, and the OTDM system having the highest multiplicity obtains 1.28 terabit per one second. Such an OTDM technology is expected to realize an increase of channel capacity and also to be applied to the ultra-high speed signal processing using broadband characteristics thereof.

As one of basic signal processing technologies in optical communications, there is a clock extracting technology. For example, the communication cannot be performed without extracting a clock synchronized with a signal light in a receiver. Generally, the technology for extracting a clock from a signal light depends on an electronic circuit as shown in FIG. 10. Namely, at first, a signal light at B(b/s) bit rate is converted into an electric signal by a photoelectric converter 100, and next, an electric clock of frequency B(Hz) same as a modulating rate of the signal light is extracted by an electric circuit 101. In the electric circuit 101, there is used a method of extracting only a clock component of frequency B(Hz) by an electric filter having a narrow band transmission characteristic or a method of generating a clock synchronized with a signal by a voltage controlled oscillator (VCO). This method has features of simple configuration and stable operation, and therefore, an apparatus for extracting a synchronous clock from a signal light of up to about 10 Gb/s bit rate is utilized in an actual system. However, the clock extracting method described above has a problem in that the synchronous clock cannot be extracted from a signal light having a band of working speed limit, generally about 50 GHz or above, of the electronic circuit.

To solve the above problem, as shown in FIG. 11 for example, an electro-optical gate 102 capable of controlling the transmittance of a light with an electric signal is used as an optical switch, so that a clock can be extracted from a signal light at a higher bit rate. According to this method, at first, the electro-optical gate 102 is driven with an electric clock of frequency B(Hz), and a signal light at N×B(b/s) bit rate is time division demultiplexed to signal lights at B(b/s) bit rate. Note, the time division demultiplexing is to demultiplex signal lights contained in a time division multiplexed light in the time domain. The electric clock used at this time is the one which is electronically extracted from the demultiplexed signal light by the above described photoelectric converter 100 and the electronic circuit 101 to be fed back via a splitter 103. As a result, a phase locked loop (PLL) is constituted, to be stably operated if the extracted electric clock is synchronized with the signal light. The method of highest speed realized up to this date by such a clock extracting method uses an electro-absorption (EA) modulator for the electro-optical gate 102, and extracts a synchronous clock of 40 GHz (or 10 GHz) from a signal light at 160 Gb/s bit rate (refer to literature 1: D. T. K. Tong et al., "160 GBIT/S CLOCK RECOVERY USING ELECTROABSORPTION MODULATOR-BASED PHASE LOCKED LOOP" Electronics Letters, Vol. 36, No. 23, 2000, pp. 1951-1952).

Further, if an optical gate responding at a higher speed is prepared as the optical switch, it becomes possible to extract the synchronous clock from the time division multiplexed signal light at a higher bit rate. If an optic-optical gate of total optics, which controls the transmittance of a signal light with a light, is combined with a short pulsed light, an optical switch of a higher speed according to the pulse width of short pulse can be realized. Namely, it becomes possible to gate a signal light at a higher bit rate. According to the theory same as that in the clock extracting method using the electro-optical gate 102 shown in FIG. 11, as shown in FIG. 12 for example, it is possible to drive an optic-optical gate 104 with a short pulsed light to separate a signal light, and then to extract a clock from the separated signal light by the above described photoelectric converter 100 and the electronic circuit 101. In this case, a short pulsed light source 105 is driven with the extracted electric synchronous clock, and the optic-optical gate 104 is controlled with the generated short pulsed light (optical clock), thereby constituting the PLL. According to the clock extracting method using such an optic-optical gate 104, up to this date, a clock of 6.3 GHz is successfully extracted from a signal light at 400 Gb/s bit rate (refer to literature 2: Osamu Kamatani et al. "Prescaled Timing Extraction from 400 Gb/s Optical Signal Using a Phase Lock Loop Based on Four-Wave-Mixing in a Laser Diode Amplifier", IEEE PHOTONICS TECHNOLOGY LETTERS, VOL. 8, NO. 8, AUGUST 1996, pp 1094-1096).

However, in the clock extracting method using the electro-optical gate shown in FIG. 11, since the working speed thereof is limited at a response speed limit of the electro-optical gate, an application limit of the clock extracting method is a signal light at 160 Gb/s bit rate, and it is extremely hard to apply the clock extracting method to a signal light at a bit rate higher than 160 Gb/s. On the other hand, in the clock extracting method using the optic-optical gate shown in FIG. 12, it is possible to extract the electric clock from a signal light of ultra-high speed exceeding 160 Gb/s bit rate. However, since a short pulsed light source of large scale and complicated configuration is needed, there is caused a problem in that the large scaling and complication of the clock extracting apparatus itself is unavoidable. To be specific, the pulse width of the short pulsed light used in the literature 2 is about picoseconds. Since a short pulsed light source stably generating such a short pulse includes a stabilization circuit, a control circuit and the like, the large scaling of the apparatus is unavoidable.

SUMMARY OF THE INVENTION

The present invention has been accomplished in view of the above problems and has an object to provide a clock extracting method and an apparatus thereof, capable of easily extracting, from a signal light train, a stable electric clock synchronized with the signal light train In order to achieve the above object, according to the present invention, there is provided a clock extracting method of demultiplexing a signal light train using an optical switch to generate a signal light at a bit rate lower than that of the signal light train, and electrically extracting, from the signal light, a clock synchronized with the signal light train. The clock extracting method includes a signal light processing step of arranging the bit intervals to have uneven periods, for the signal light train having the bit intervals shorter than a switching time of the optical switch, to make the bit intervals between a predetermined signal light and signal lights adjacent to the predetermined signal light to be longer than the switching time of the optical switch; an optical switch processing step of selectively demultiplexing the predetermined signal light from the signal light train processed by the signal light processing step using the optical switch, to generate a signal light at a bit rate lower than that of the signal light train; and an electric clock extracting step of electrically extracting the clock synchronized with the signal light train from the signal light generated by the optical switch processing step.

Further, according to the present invention, there is provided a clock extracting apparatus for demultiplexing a signal light train using an optical switch to generate a signal light at a bit rate lower than that of the signal light train, and electrically extracting, from the signal light, a clock synchronized with the signal light train. The clock extracting apparatus has: a signal light processing section that arranges the bit intervals to have at uneven periods, for the signal light train having bit intervals shorter than a switching time of the optical switch, to make bit intervals between a predetermined signal light and signal lights adjacent to the predetermined signal light to be longer than the switching time of the optical switch; an optical switch processing section that selectively demultiplexes the predetermined signal light from the signal light train processed by the signal light processing section using the optical switch, to generate a signal light at a bit rate lower than that of the signal light train; and an electric clock extracting section that electrically extracts a clock synchronized with the signal light train from the signal light generated by the optical switch processing section.

In such clock extracting method and clock extracting apparatus, the signal light train having the bit intervals shorter than the switching time of the optical switch is converted into the signal light train having the bit intervals arranged to have uneven periods, so that the bit intervals between the predetermined signal light and the signal lights adjacent to the predetermined signal light are made to be longer than the switching time of the optical switch. Then, from the signal light train whose bit intervals are arranged at uneven periods, the predetermined signal light is selectively demultiplexed and the bit rate thereof is thinned out at a low speed, so that the synchronous clock is electrically extracted from the demultiplexed signal light.

According to the clock extracting method and apparatus thereof of the present invention described above, it becomes possible to extract, from the signal light train of ultra-high speed exceeding 160 Gb/s bit rate, a stable electric clock synchronized with the signal light train. Further, since a low speed electric circuit can be applied for electrically extracting the clock from the signal light at the bit rate lower than that of the signal light train, it is possible to realize a clock extracting apparatus of low cost. The clock extracting technology is one of essential signal processing technologies, and therefore, the present invention achieves the effect of accelerating the researches and developments of signal processing technology and the like using an ultra-high speed signal light, which were unable to be realized hereinbefore, and also the effect of bringing these technologies into practical use.

Other objects, features and advantages of the present invention will become apparent from the following explanation of the embodiments, in conjunction with the appended drawings.

DESCRIPTION OF THE PREFERRED EMBODIMENTS

Figure 1:
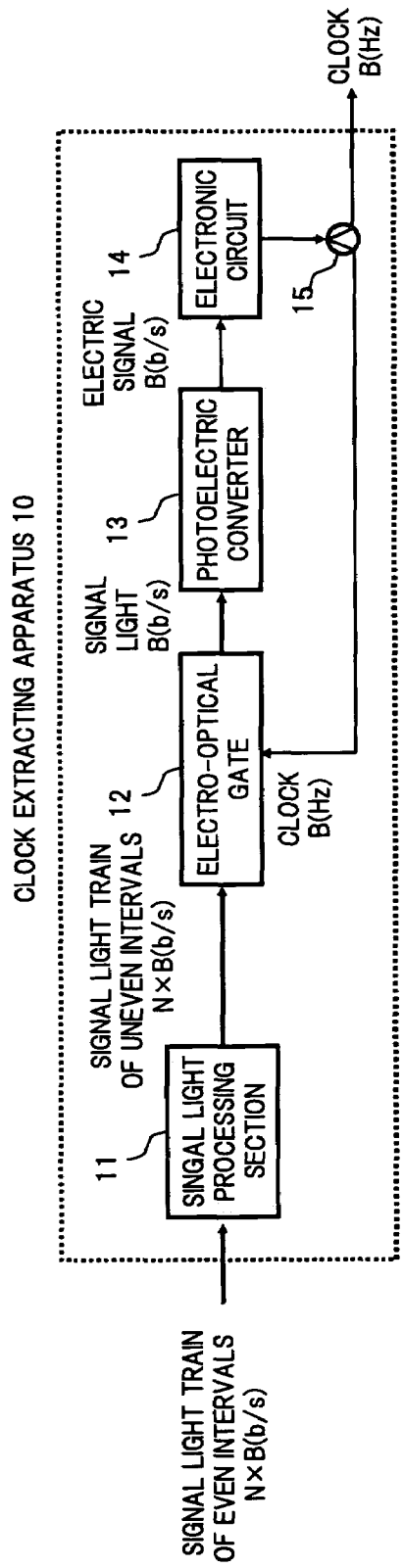
FIG. 1 is a diagram showing a basic configuration of a clock extracting apparatus according to the present invention.

There will be described embodiments for implementing the present invention, with reference to the accompanying drawings. The same reference numerals denote the same or equivalent parts in all drawings.

Firstly, there will be described the theory of a clock extracting method of the present invention.

Figure 11:
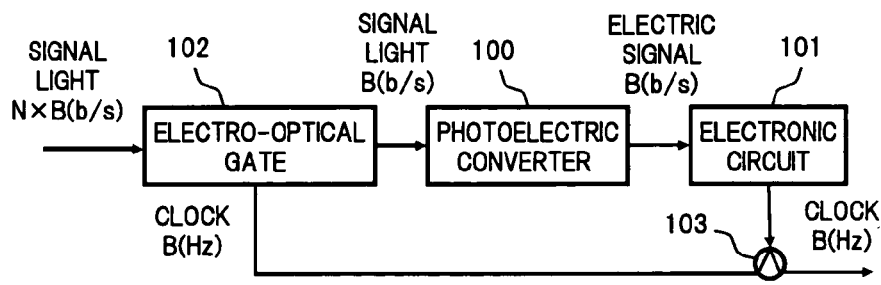
FIG. 11 is a diagram for explaining a conventional clock extracting method using an electro-optical gate.
Figure 12:
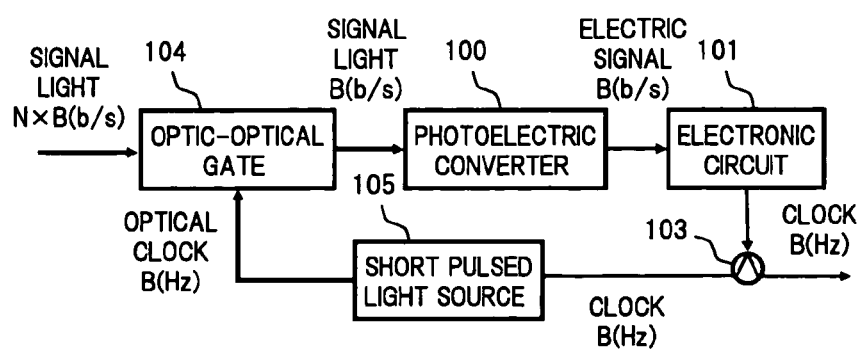
FIG. 12 is a diagram for explaining a conventional clock extracting method using an optic-optical gate.

As described in the above, although a clock extracting method using an electro-optical gate such as an EA modulator or the like (refer to FIG. 11), has the feature of stable operation, a bit rate of a signal light train from which a clock can be extracted is still limited to about 160 Gb/s. To be specific, in the case where the EA modulator is modulated at 40 GHz, it is possible to narrow the gate width thereof to about 6 picoseconds so that a 160 Gb/s signal light of 6.25 picoseconds bit intervals can be demultiplexed to a 40 Gb/s signal light. However, a 320 Gb/s signal light having bit intervals which are narrowed to about 3 picoseconds half 6 picoseconds, cannot be sufficiently demultiplexed by the EA modulator.

However, even in a signal light train having a bit rate of 640 Gb/s or 320 Gb/s higher than 160 Gb/s, if the intervals thereof are not even and an interval of a part of signal light train is about 6 picoseconds for example, the signal having the interval of 6 picoseconds is gated so that a clock can be extracted. As shown in FIG. 1, the present invention is characterized in that a signal light processing section 11 that converts an input signal light train into a signal light train having bit intervals which are arranged at periodically uneven, is disposed on the former stage of an electro-optical gate 12, so that bit intervals between a predetermined signal light and signal lights adjacent to the predetermined signal light are lengthened to intervals at which the predetermined signal light can be demultiplexed, namely, to intervals longer than a switching time of the electro-optical gate 12. Note, the electro-optical gate 12, a photoelectric converter 13, an electronic circuit 14 and a splitter 15, each arranged on the latter stage of the signal light processing section 11, are basically same as the conventional configurations shown in FIG. 11.

Here, a method of making a signal light train having even intervals at N×B(b/s) bit rate to be a signal light train of uneven bit interval arrangement will be described in detail using FIG. 2 and FIG. 3. In each figure, N=10 is shown as one example.

Firstly, the signal light train is phase modulated based on a cyclic signal of $B^{-1}(s)$ as one cycle. Provided that 10 signal lights in one cycle are respectively ch.1, . . . , ch.10, the description will be made as follows. The upper part of FIG. 2 shows an intensity waveform of the signal light train in the case where the signal light train is phase modulated based on an electric signal of sinusoidal wave. By this phase modulation, as shown in the lower part of FIG. 2, frequency chirping according to time positions of the respective signal lights in the cycle is caused in the signal light train. As a result, although the bit intervals between the signal lights are still even, the wavelengths are different for every signal lights.

Next, the phase modulated signal light train is given to a dispersive medium to be propagated through the dispersive medium. Since group delay times are different according to the wavelengths in the dispersive medium, bit intervals between a given signal light and signal lights adjacent to the given signal light are lengthened, or otherwise bit intervals between a given signal light and signal lights adjacent to the given signal light are shortened. In an anomalous dispersive medium through which a high frequency component is propagated faster than a low frequency component, as shown by arrows in FIG. 3, the signal lights (ch.2 to ch.5) up-chirped by the phase modulation are propagated slowly, while the down-chirped signal lights (ch.7 to ch.10) are propagated fast. Accordingly, in the case where the phase modulation is given based on the sinusoidal wave, in the vicinity of the channel (ch.6) at which the frequency chirping is changed from the up-chirping to the down-chirping, the bit intervals between the channel (ch.6) and the adjacent signal lights are lengthened. Contrary to this, in the vicinity of the channel (ch.1) at which the frequency chirping is changed from the down-chirping to the up-chirping, the bit intervals between the channel (ch.1) and the adjacent signal lights are shortened. The switching window width of a given optical gate is shown by the hatched region in each of the upper parts of FIG. 2 and FIG. 3 as one example. It is understood that, although only one bit cannot be separated in the case of the signal light train of even bit intervals, it becomes possible to separate only one bit by arranging the bit intervals at uneven periods.

Thus, according to the present invention, the bit intervals of only a part of the signal light train at a high bit rate are lengthened, the signal light whose bit intervals between the adjacent signal lights are lengthened is separated by the optical gate, the separated signal light is converted into the electric signal and the clock is extracted from the electric signal, so that the clock synchronized with the high speed signal light train can be extracted without the necessity of using a short pulsed light source or an optic-optical gate. Note, the signal light train may be a signal light multiplexed by an OTDM system or a signal light electrically multiplexed.

There will be described hereinafter a specific embodiment of an apparatus to which the clock extracting method according to the present invention as described in the above is applied.

Figure 4:
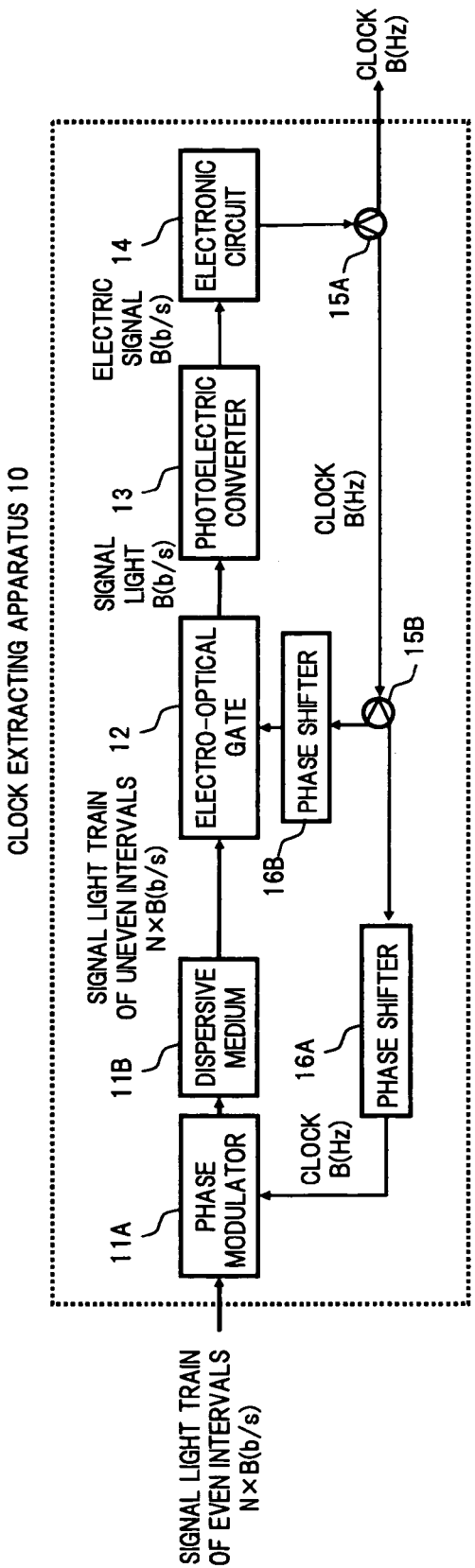
FIG. 4 is a diagram showing a configuration of one embodiment of the clock extracting apparatus according to the present invention.

FIG. 4 is a block diagram showing a configuration of one embodiment of a clock extracting apparatus according to the present invention.

In FIG. 4, the present clock extracting apparatus 10 comprises: for example, a phase modulator 11A and a dispersive medium 11B, which correspond to the signal light processing section 11 shown in FIG. 1; an electro-optical gate 12 on which a signal light train propagated through the dispersive medium 11B is incident; a photoelectric converter 13 converting a signal light output from the electro-optical gate 12 into an electric signal; an electronic circuit 14 extracting a clock from the electric signal converted by the photoelectric converter 13; a splitter 15A branching the clock extracted by the electronic circuit 14 into two clocks; a splitter 15B further branching one of the clocks branched by the splitter 15A into two clocks; a phase shifter 16A adjusting a phase of one of the clocks from the splitter 15B to give the phase adjusted clock to the phase modulator 11A; and a phase shifter 16B adjusting a phase of the other clock from the splitter 15B to give the other clock phase adjusted to the electro-optical gate 12.

Here, the phase modulator 11A functions as a wavelength converting section, and the dispersive medium 11B functions as a group delay generating section. Further, the electro-optical gate 12 functions as an optical switch processing section, and the photoelectric converter 13 and electronic circuit 14 function as an electric clock extracting section. Moreover, the phase shifters 16A and 16B function as a timing control section.

Figure 2:
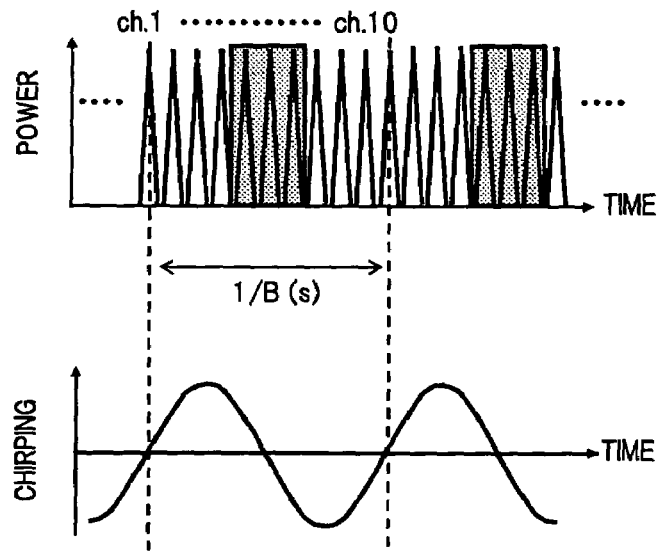
FIG. 2 is a first diagram for explaining a method of realizing signal lights of uneven interval arrangement in the present invention.
Figure 3:
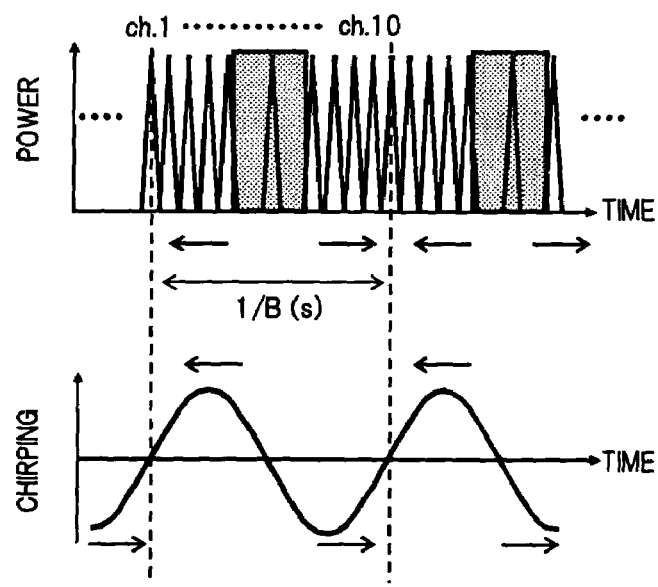
FIG. 3 is a second diagram for explaining a method of realizing signal lights of uneven interval arrangement in the present invention.

In the clock extracting apparatus 10 as described above, the signal light train of even intervals at N×B(b/s) bit rate is incident on the phase modulator 11A The signal light train of even intervals incident on the phase modulator 11A is subjected to the phase modulation of frequency B(Hz) by the phase modulator 11A driven based on the sinusoidal wave electric clock of frequency B(Hz) as shown in FIG. 2, and the frequency chirping is caused. Note, a drive signal for the phase modulator 11A is not necessarily the sinusoidal wave. However, in the case where the drive signal is the sinusoidal wave, since a band is narrow, there is an advantage that the electronic circuit is not complicated. Timing of the phase modulation on the signal light train of even intervals is controlled by adjusting a phase of the sinusoidal wave electric clock to be applied on the phase modulator 11A, so that a given signal light pulse is not influenced by the frequency chirping, that is, the peak or bottom of the sinusoidal wave of a phase modulating signal (electric clock) is coincident with a given signal light pulse.

For example, when the quality of the extracted clock is highest, a condition is achieved in which the peak or bottom of the sinusoidal wave of the phase modulating signal (electric clock) is coincident with the given signal light pulse. Therefore, the control is performed by repetitively performing operations of: 1) controlling a phase of the phase shifter 16B by one cycle with respect to a given value of the phase shifter 16A, to monitor a phase noise and an intensity noise of the extracted clock; and 2) performing an operation same as 1) with respect to another value of the phase shifter 16A, to set the values of the phase shifters 16A and 16B at a condition that the quality of the regenerated clock is highest.

As a preferable specific example of the phase modulator 11A, there is a phase modulator using lithium niobate (LiNbO$_3$: LN), typically called LN modulator. It is known that, in the LN modulator, a gap between signal and ground electrodes is widened to achieve the reduction of microwave attenuation and a waveguide is lengthened, so that a voltage V$\pi$ (half-wave voltage) necessary to modulate a phase by $\pi$ can be reduced (refer to Japanese Unexamined Patent Publication No. 2003-262841). Therefore, in the case where the phase is modulated based on the signal of the same amplitude sinusoidal wave, a large phase modulation index can be achieved. Further, in order to realize a desired phase modulation index, only the sinusoidal wave signal of small amplitude is needed. Namely, since the electric power necessary for the phase modulation is reduced, the LN modulator is effective for achieving the low electric power consumption of the clock extracting apparatus 10.

In the case where the LN modulator is used as the phase modulator 11A, it is preferable to design it considering a polarization state of the incident signal light. Namely, since the polarization state of the signal light fluctuates depending on changes in environment and the like, it is desirable that the phase modulator is operated without depending on the polarization state of the incident signal light However, generally, the LN modulator has a modulation characteristic which depends on the polarization state of the incident signal light. In order to avoid this polarization dependence, a polarization stabilizing apparatus which outputs an input signal light at the fixed polarization may be disposed on the former stage of the LN modulator. Or, the LN modulator may be of a polarization diversity configuration. To be specific, the signal light to be phase modulated is separated into two orthogonal components, for example, TE wave and TM wave, and these two components are phase modulated by individual LN modulators, to be multiplexed at timing same as before separation.

As another preferable specific example of the phase modulator 11A, there is a phase modulator using an indium phosphorous (InP) series material. The phase modulator using the InP series material can reduce a difference between optical entrapped amounts during the TE wave component and the TM wave component are respectively propagated through the waveguide. Therefore, it is possible to realize the phase modulation without polarization dependence and the stable operation of the clock extracting apparatus 10 without the necessity of disposing the polarization stabilizing apparatus as described above.

The signal light train phase modulated by the phase modulator 11A as described above is then incident on the dispersive medium 11B. In the dispersive medium 11B, by utilizing the group delay time difference due to the wavelengths as shown in FIG. 3, the bit intervals of the signal light train are made uneven.

As a specific example of the dispersive medium 11B, there is a conventional single mode optical fiber, a dispersion compensation fiber or the like. Further, it is also possible to realize the dispersive medium 11B by utilizing a fiber Bragg grating, a photonic crystal fiber or the like. Since the single mode optical fiber has a small propagation loss, the quality degradation of the signal light on the former stage of the electro-optical gate 12 can be suppressed. Thus, the clock extracting apparatus 10 of high quality can be realized. In the case where the dispersion compensation fiber is used, a dispersion value thereof per unit length is large and a loss thereof is small. Therefore, the required length of the dispersive medium 11B can be shortened, to achieve the miniaturization of the entire clock extracting apparatus 10. Further, in the case where the fiber Bragg grating or the photonic crystal fiber is used, since a dispersion value thereof per unit length can be increased to be larger than the dispersion value of the dispersion compensation fiber, it becomes possible to further shorten the length of the dispersive medium 11B. In addition, as a result of the miniaturization of the dispersive medium 11B, it is possible to remove an unstable element caused by the fluctuation of fiber length, and therefore, an effect of increasing the stability of the entire clock extracting apparatus 10 can be expected.

The signal light train of uneven intervals passed through the dispersive medium 11B as described above is incident on the electro-optical gate 12 which is driven based on the sinusoidal wave electric clock of frequency B(Hz). In the electro-optical gate 12, a phase of the drive signal (sinusoidal wave electric clock) is adjusted by the phase shifter 16B so as to select a signal light pulse, adjacent intervals of which are lengthened, in the signal light train of uneven intervals, so that the signal light pulse is separated from the incident signal light train of uneven intervals, and a signal light whose bit rate is thinned out at B(b/s) is generated.

As a specific component for realizing the electro-optical gate 12, there is an electro-absorption (EA) modulator, a LiNbO$_3$ intensity modulator or the like, for example. The EA modulator is operable without depending on the polarization state of the incident signal, and therefore, can realize the stably operating electro-optical gate 12. Further, if the LiNbO$_3$ intensity modulator is used, since the amplitude of the electric signal necessary for driving the electro-optical gate 12 can be reduced due to the reduction of the half-wave voltage, it is possible to achieve the low electric power consumption of the entire clock extracting apparatus 10.

Note, in the configuration example of FIG. 4, the phase shifter 16B is arranged between the splitter 15B and the electro-optical gate 12. However, since the phase shifter 16B merely controls a relative time relationship between the respective operations of the phase shifter 11A and the electro-optical gate 12, the phase shifter 16B is not necessarily disposed on the above described position. In place of the phase shifter 16B, an optical delay line may be inserted between the phase modulator 11A and the electro-optical gate 12 to control the time relationship.

The signal light at B(b/s) bit rate output from the electro-optical gate 12 as described above is converted into an electric signal by the photoelectric converter 13, to be sent to the electronic circuit 14. In the electronic circuit 14, a clock of frequency B(Hz) is electrically extracted using a signal output from the photoelectric converter 13.

As a specific method of realizing the clock extraction in the electronic circuit 14, there is for example a method of extracting a component of frequency B(Hz) contained in the electric signal from the photoelectric converter 13, by an electric filter. In the case where the clock is extracted by this method, in principle a necessary component is only the electric filter, and therefore, it becomes possible to miniaturize the entire apparatus.

As another method of realizing the clock extraction in the electronic circuit 14, it is also possible to compare, by a phase comparator, a phase of the electric signal from the photoelectric converter 13 and a phase of an electric clock of frequency B(Hz) output from a voltage controlled oscillator (VCO), to realize the clock extraction using a phase locked loop (PLL) which feeds back a signal proportional to a phase error to the VCO. According to this method, since a clock of low phase noise, that is, low jitter, can be extracted by optimizing a PLL circuit, it is possible to realize an apparatus capable of extracting a high quality clock of low phase noise.

As a further method of realizing the clock extraction in the electronic circuit 14, it is also possible to inject signal lights from both ends of the EA modulator, to realize the clock extraction using the PLL which drives the VCO based on a bi-polar error signal (refer to the literature: C. Boemer et al., "160 Gbit's clock recovery with electro-optical PLL using bidirectionally operated electroabsorption modulator as phase comparator", Electronics Letters, Vol. 39, No. 14, 2003, pp. 1071-1073). According to this method, it becomes possible to extract further stably the electric clock of frequency B(Hz).

As described in the above, according to the clock extracting apparatus 10 in the present embodiment, with the miniaturized simple apparatus configuration, it becomes possible to supply the stable electric clock synchronized with an ultra-high speed signal light train at a bit rate exceeding 160 Gb/s. Further, it also becomes possible to supply at low cost the electric clock synchronized with a signal light train at a bit rate of about 40 Gb/s or less by using a further low speed electronic circuit.

In the above embodiment, the description has been made on the specific examples of each component constituting the clock extracting apparatus 10. However, each component in the present invention is not limited to the above specific examples. Further, as a modified example of the present embodiment, the configuration may be such that the electric clock is extracted from the signal light at B(b/s) bit rate separated by the electro-optical gate 12, by each of the photoelectric converter 13 and the electronic circuit 14, and at the same time, the demultiplexing is performed on data of the signal light at B(b/s) bit rate separated by the electro-optical gate 12, using the extracted clock. As a result, it becomes possible to generate not only the electric clock but also the electric data, to thereby receive an ultra-high speed signal. Further, the present invention is useful for monitoring a part of signal lights contained in the light in order to supervisory control an optical communication system.

Next, there will be described an example in which a reception apparatus of an optical communication system is configured using the clock extracting apparatus 10 described above.

Figure 5:
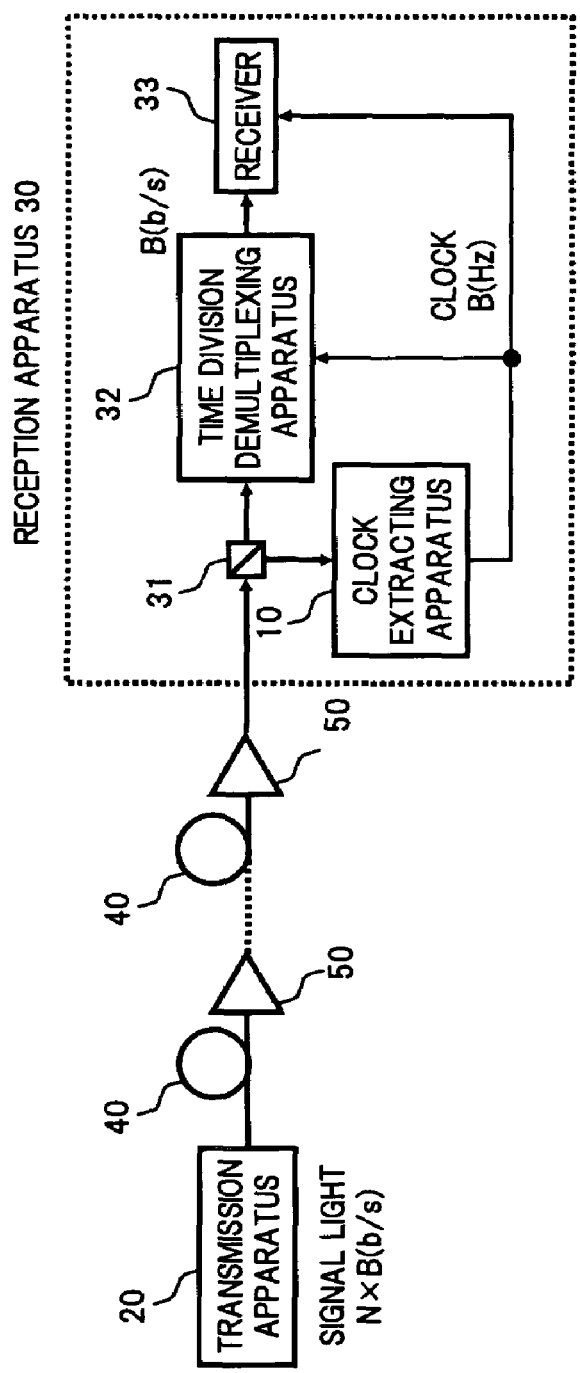
FIG. 5 is a diagram showing one example in which the present invention is applied to constitute a reception apparatus of an optical communication system.

FIG. 5 is a block diagram showing a configuration of the optical communication system.

In FIG. 5, a transmission apparatus 20 transmits signal light pulses of even intervals at N×B(b/s) bit rate to an optical transmission path 40. A plurality of optical amplifiers 50 is disposed on the optical transmission path 40 at required repeating intervals, and a signal light propagated through the optical transmission path 40 is transferred to a reception apparatus 30 while being amplified by the respective optical amplifiers 50.

In the reception apparatus 30, the signal light at N×B(b/s) bit rate propagated through the optical transmission path 40 and the optical amplifiers 50 is branched into two signal lights, and one of the branched signal lights is incident on the clock extracting apparatus 10 (refer to FIG. 4), while the other signal light is incident on a time division demultiplexing apparatus 32. The electric clock of frequency B(Hz) extracted by the clock extracting apparatus 10 is given to the time division demultiplexing apparatus 32 and to a receiver 33. In the time division demultiplexing apparatus 32, the signal light at B(b/s) bit rate is time division demultiplexed from the signal light at N×B(b/s) bit rate incident via an optical branching coupler 31, by an optical gate (not shown in the figure) which is driven based on the electric clock of frequency B(Hz) from the clock extracting apparatus 10.

A specific example of the time division demultplexing apparatus 32 can be realized by combining the phase modulator 11A, the dispersive medium 11B and the electro-optical gate 12, which constitute a part of the clock extracting apparatus 10. In this case, the phase of the electric clock from the clock extracting apparatus 10 is appropriately controlled to drive the phase modulator 11A and the electro-optical gate 12, and the signal light at B(b/s) bit rate is time division demultiplexed from the signal light train at N×B(b/s) bit rate, which passed through the phase modulator 11A and the dispersive medium 11B and then the bit intervals thereof are made uneven, by the electro-optical gate 12.

As another specific example of the time division demultiplexing apparatus 32, the configuration thereof may be such that an optical clock is generated based on the electric clock from the clock extracting apparatus 10, and an optic-optical gate is driven using the optical clock so that the signal light at B(b/s) bit rate is demultiplexed. The optical gate in such a case can be realized by a non-linear optical fiber or the one using a four-wave mixing effect being a non-linear effect which is caused in a semiconductor optical amplifier, or by a non-linear optical fiber or a non-linear optical fiber loop mirror utilizing a phase change induced due to a relative phase modulation effect.

The signal light at B(b/s) bit rate demultiplexed by the time division demultiplexing apparatus 32 as described above is received to be processed by the known receiver 33 corresponding to B(b/s) bit rate.

As described in the above, by applying the clock extracting apparatus 10 of the present invention to the reception apparatus 30 of the optical communication system, it becomes possible to realize the reception processing of the signal light of ultra-high speed exceeding 160 Gb/s bit rate with a simple apparatus configuration. Especially, if the time division multiplexing apparatus shown in the first example of the time division demultiplexing apparatus 32 is used, the ultra-high speed time division multiplexed signal light can be subjected to the reception processing with a simple and miniaturized apparatus configuration.

Figure 6:
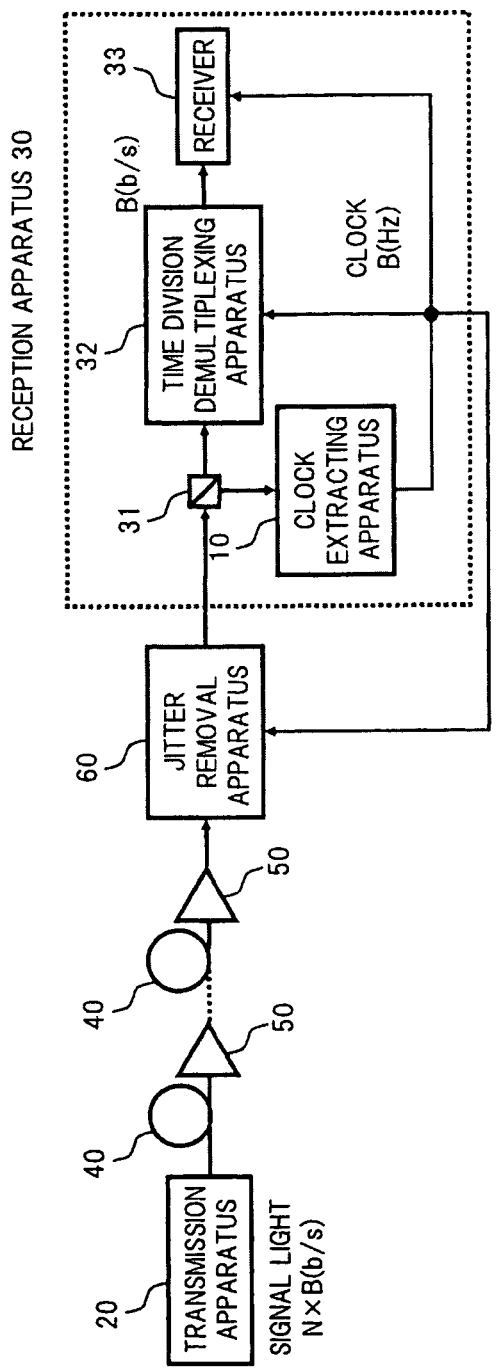
FIG. 6 is a diagram showing an application example considering an influence of jitter related to the optical communication system of FIG. 5.

Note, in the optical communication system as described above, generally, the jitter being the fluctuation in a time direction is added to the signal light during the transmission of signal light, due to an interaction of an amplified spontaneous emission light noise and a non-linear effect, which are caused in the optical amplifiers 50 for repeating. If this jitter is increased, there is a possibility that the clock cannot be extracted stably from the signal light in the reception apparatus 20. In such a case, as shown in FIG. 6 for example, by arranging a jitter removal apparatus 60 on the former stage of the reception apparatus 30, it becomes possible to remove the jitter added to the signal light after transmitted.

Figure 7:
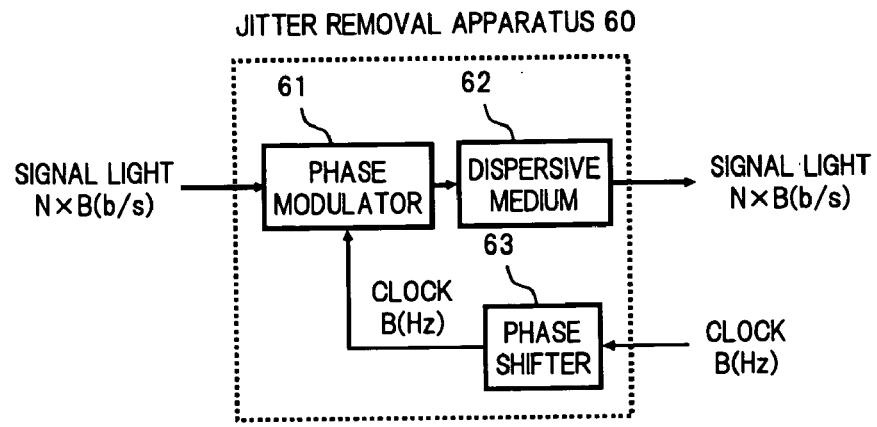
FIG. 7 is a diagram showing a specific configuration example of a jitter removal apparatus used in the application example of FIG. 6.

The physical theory for realizing the jitter removal apparatus 60 described above was proposed for example in the literature: L. A Jiang et al., "Timing jitter eater for optical pulse trains", Optics Letters, Vol. 28, No. 2, 2003, pp. 78-80. A method in which the phase modulation and the dispersive medium are combined is effective. However, in the method recited in the above literature, the signal light needs to be phase modulated at a speed same as the bit rate of the signal light, in order to remove all the jitter in the signal light. Accordingly, the above described known technology cannot be applied to the signal light of ultra-high speed exceeding an electric bandwidth. On the other hand, in the optical communication system to which the present invention as shown in FIG. 6 is applied, it is enough to remove only the jitter in the signal light at B(b/s) bit rate which is separated from the signal light at N×B(b/s) bit rate. Therefore, as shown in FIG. 7 for example, a specific configuration of the jitter removal apparatus 60 may be such that, using the electric clock of frequency B(Hz) obtained by the clock extracting apparatus 10 in the reception apparatus 30, a phase modulator 61 is driven based on a signal light obtained by adjusting the phase of the electric clock by a phase shifter 63, so that the signal light at N×B(b/s) bit rate which is phase modulated by the phase modulator 61 is given to a dispersive medium 62. Note, as the phase modulator 61 and the dispersive medium 62, which are used in the jitter removal apparatus 60 in FIG. 7, those same as the phase modulator 11A and the dispersive medium 11B, which are used in the clock extracting apparatus 10, can be adopted.

Here, the theory of jitter suppression in the jitter removal apparatus 60 of the above configuration will be described using FIG. 8. Note, also in FIG. 8, N=10 same as in the cases exemplarily shown in FIG. 2 and FIG. 3.

Figure 8:
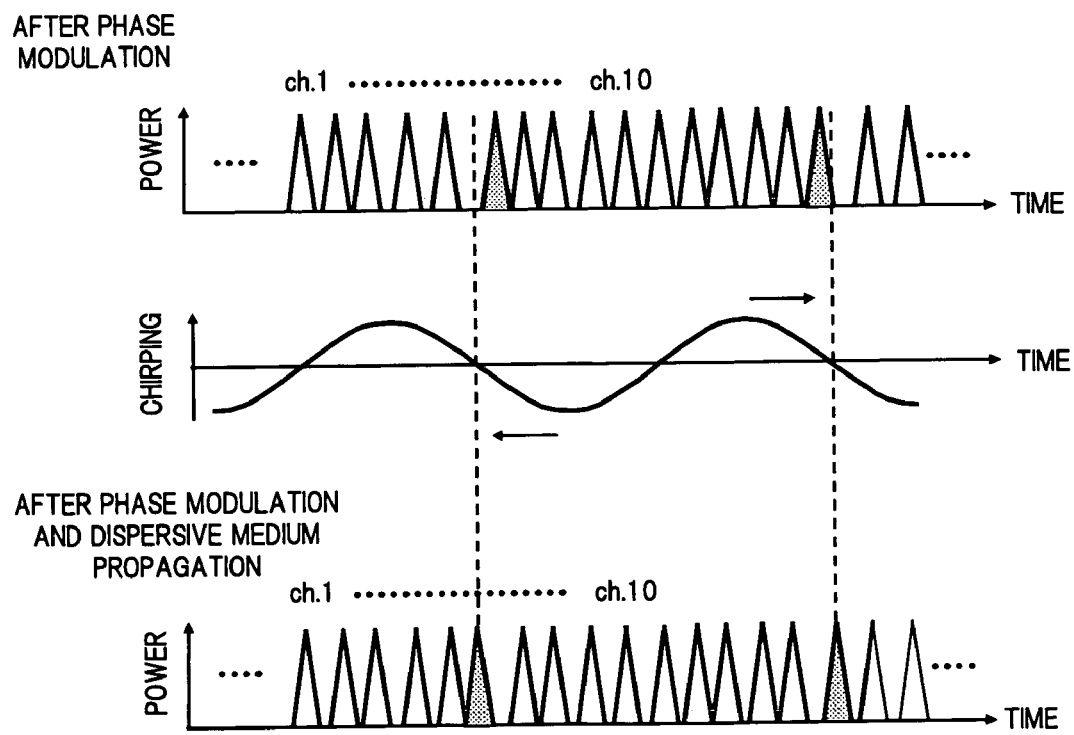
FIG. 8 is a diagram for explaining the theory of jitter suppression in the jitter removal apparatus of FIG. 7.

The upper part of FIG. 8 shows a signal light train added with the jitter, and the consideration is made on the signal light (signal light shown by the hatched region in the figure) which is to be demultiplexed for each 10 signal lights from the signal light train. The signal lights are subjected to the phase modulation of frequency B(Hz) by the phase modulator 61 of the jitter removal apparatus 60, and the phase modulated signal lights are given to the dispersive medium 62. Timing of the phase modulation and the signal lights in the phase modulator 61 is adjusted by the phase shifter 63 so that the chirping becomes zero at a time (point shown by the broken line in the figure) subtracted by a period of time during which the considered signal light whose jitter is to be removed is deviated due to the jitter. The group delay times of the signal lights whose wavelengths are changed due to the chirping are different for each wavelength due to the group speed dispersion in the dispersive medium 62, and therefore, the jitter added to the signal lights is removed by utilizing the group delay time difference. Herein, as shown by the arrows in the figure, the signal lights are propagated through the normal dispersive medium in which the down-chirped signal light is propagated fast while the up-chirped signal light is propagated slowly, so that as shown in the bottom part of FIG. 8, the considered signal light returns to the position at which the jitter is not yet added, and then, the jitter is removed.

Next, there will be described one example in which an optical 3R regenerator of the optical communication system is configured using the clock extracting apparatus 10 described above.

Firstly, briefly describing the optical 3R regeneration repeater, "3R" abbreviates "Reamplificabon", "Retiming" and "Reshaping". The optical 3R regeneration repeater is for regenerating the quality of signal light, and is used for regenerating the quality of signal light which is degraded due to the long distance transmission or the multi-staged switch connection. In such an optical 3R regeneration repeater, differently from the 2R signal regeneration which does not perform the retiming, since the retiming is performed, a clock synchronized with the signal light is needed.

Figure 9:
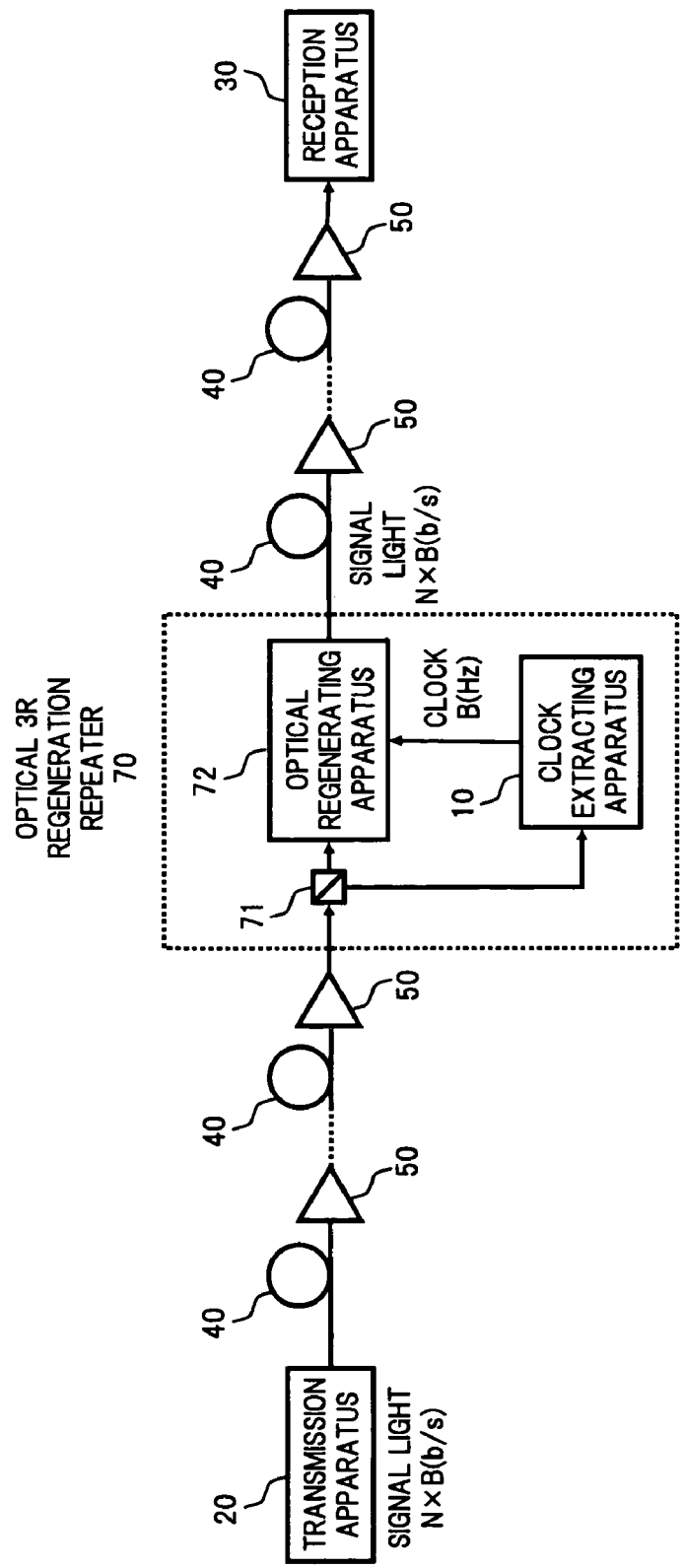
FIG. 9 is a diagram showing an example in which the present invention is applied to constitute an optical 3R regeneration repeater in the optical communication system.
Figure 10:
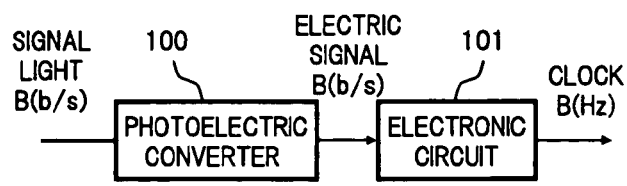
FIG. 10 is a diagram for explaining a conventional clock extracting method using an electric circuit.

Therefore, in an optical 3R regeneration repeater 70 of the optical communication system shown in FIG. 9, the signal light at N×B(b/s) bit rate sent from the transmission apparatus 20 and transmitted via the optical transmission path 40 and the optical amplifiers 50 is branched into two signal lights by an optical branching coupler 71, and one of the branched signal lights is incident on the clock extracting apparatus 10 (refer to FIG. 4) while the other signal light is incident on an optical regenerating apparatus 72. In the optical regenerating apparatus 72, the clock of frequency N×B(Hz), which was subjected to retiming, is subjected to the switching processing based on the signal light at N×B(b/s) bit rate, and also a waveform thereof is reshaped. In such signal regeneration, all the signal lights contained in the time division multiplexed light need to be regenerated. Accordingly, in the optical regenerating apparatus 72, an optical switch of total optics (not shown in the figure) responding to an ultra-high speed bit rate is required. As a specific example of the optical switch of total optics, there is an optical Kerr switch using a non-linear fiber, a non-linear fiber loop mirror or the like. Further, the frequency of the electric clock extracted by the clock extracting apparatus 10 becomes B(Hz) corresponding to the bit rate after the time division demultiplexing, and therefore, the clock needs to be multiplexed to have the frequency N×B (Hz). For this purpose, using the electric clock output from the clock extracting apparatus 10 for example, a short pulsed optical clock of pulse width below 1/(N×B) may be generated, to be time division multiplexed to the frequency N×B (Hz) in self-delay type using a fiber delay circuit, a waveguide delay circuit or the like.

As described in the above, by applying the clock extracting apparatus 10 of the present invention to the optical 3R regeneration repeater 70 of the optical communication system, it becomes possible to realize the 3R regeneration processing of the time division multiplexed signal light of ultra-high speed exceeding 160 Gb/s bit rate with a miniaturized and simple apparatus configuration.

Note, in FIG. 9, one example of the optical communication system has been shown in which the signal light quality degraded due to the long distance fiber transmission is regenerated by the optical 3R regeneration repeater 70. However, the present invention is not limited thereto, and it is possible to apply the present invention to the case where, in an optical network for example, the signal light quality degraded due to a noise light generated in an optical amplifier which compensates for a loss due to the fiber transmission, switch passing or the like, is regenerated by the optical 3R regenerator.

What is claimed is:

1. A clock extracting method of extracting a clock synchronized with a signal light train, comprising:
 a signal light processing step performed using an optical switch, of arranging bit intervals of said signal light train having the bit intervals shorter than a switching time of said optical switch, at uneven periods, to make a first bit interval between a predetermined signal light and a first adjacent signal light before said predetermined signal light and a second bit interval between said predetermined signal light and a second adjacent signal light following said predetermined signal light to be longer than the switching time of said optical switch;
 an optical switch processing step of selectively demultiplexing said predetermined signal light from said signal light train processed by said signal light processing step using said optical switch, to generate a signal light at a bit rate lower than that of said signal light train; and
 an electric clock extracting step of electrically extracting a clock synchronized with said signal light train from the signal light converted into an electrical signal by a photoelectric converter.

2. A clock extracting method according to claim 1,
 wherein said signal light processing step periodically phase modulates said signal light train, to generate frequency chirping, and converts wavelengths of a plurality of signal lights contained in one cycle into respectively different wavelengths, and thereafter, gives group delay times which are different to each other depending on the respectively different wavelengths to said signal light train whose wavelengths are converted, to arrange the bit intervals of said signal light train at uneven periods.

3. A clock extracting method according to claim 2, further comprising;

a timing control step of controlling a relative time relationship between phase modulation timing in said signal light processing step and an operation of the optical switch in said optical switch processing step.

4. A clock extracting apparatus for demultiplexing a signal light train using an optical switch to generate a signal light at a bit rate lower than that of said signal light train, and electrically extracting, from said signal light, a clock synchronized with said signal light train, comprising:

a signal light processing section that, for said signal light train having bit intervals shorter than a switching time of said optical switch, arranges said bit intervals at uneven periods, to make a first bit interval between a predetermined signal light and a first adjacent signal light before said predetermined signal light and a second bit interval between said predetermined signal light and a second adjacent signal light following said predetermined signal light to be longer than the switching time of said optical switch;

an optical switch processing section that selectively demultiplexes said predetermined signal light from said signal light train processed by said signal light processing section using said optical switch, to generate a signal light at a bit rate lower than that of said signal light train; and an electric clock extracting section that electrically extracts a clock synchronized with said signal light train from the signal light generated by said optical switch processing section.

5. A clock extracting apparatus according to claim 4, wherein said signal light processing section comprises:

a wavelength converting section that periodically phase modulates said signal light train, to generate frequency chirping, and converts wavelengths of a plurality of signal lights contained in one cycle into respectively different wavelengths; and a group delay generating section that gives group delay times which are different to each other depending on the respectively different wavelengths to said signal light train whose wavelengths are converted by said wavelength converting section, to arrange the bit intervals of said signal light train at uneven periods.

6. A clock extracting apparatus according to claim 5, further comprising;

a timing control section that controls a relative time relationship between phase modulation timing in said wavelength converting section and an operation of the optical switch in said optical switch processing section.

7. A clock extracting apparatus according to claim 5, wherein said wavelength converting section drives a phase modulator using lithium niobate with a sinusoidal wave, to convert wavelengths of a plurality of signal lights in one cycle of said sinusoidal wave.

8. A clock extracting apparatus according to claim 7, wherein said signal light processing section comprises a polarization stabilizing apparatus which fixes a polarization state of the signal light train incident on said phase modulator using lithium niobate.

9. A clock extracting apparatus according to claim 5, wherein said wavelength converting section drives a phase modulator using an indium phosphorous series material with a sinusoidal wave, to convert wavelengths of a plurality of signal lights in one cycle of said sinusoidal wave.

10. A clock extracting apparatus according to claim 5, wherein said group delay generating section generates group delay times different for every wavelengths using any one of a normal dispersion fiber, a dispersion compensation fiber, a fiber Bragg grating and a photonic crystal fiber.

11. A clock extracting apparatus according to claim 4, wherein said optical switch processing section comprises an optical switch capable of controlling the transmittance of signal light with an electric signal.

12. A clock extracting apparatus according to claim 11, wherein said optical switch comprises any one of an electro-absorption optical modulator, a lithium niobate intensity modulator and an indium phosphorous intensity modulator.

13. An optical communication system for receiving signal lights transmitted from a transmission apparatus at a reception apparatus via an optical transmission path, comprising a clock extracting apparatus as recited in claim 4.

14. An optical communication system according to claim 13, further comprising; a jitter removal apparatus which removes the jitter caused in the signal lights received at said reception apparatus.

15. An optical communication system comprising an optical 3R regeneration repeater which receives signal light transmitted on an optical transmission path, and performs the quality regeneration processing on said signal lights, to transmit said quality regenerated signal lights to said optical transmission path, comprising a clock extracting apparatus as recited in claim 4.

* * * * *